(12) United States Patent
Hartman et al.

(10) Patent No.: US 8,661,043 B1
(45) Date of Patent: Feb. 25, 2014

(54) DISTRIBUTED FEATURE SELECTION IN SOCIAL NETWORKS

(75) Inventors: Brian Jay Hartman, Bellevue, WA (US); Christopher Alan Hays, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/585,578

(22) Filed: Aug. 14, 2012

(51) Int. Cl.
 *G06F 17/30* (2006.01)
(52) U.S. Cl.
 USPC .......................................................... 707/748
(58) Field of Classification Search
 USPC ......... 707/2, 3, 748; 705/7.31, 26.5; 345/589; 235/386
 See application file for complete search history.

(56) References Cited

U.S. PATENT DOCUMENTS

| | | | | |
|---|---|---|---|---|
| 7,377,431 | B2 * | 5/2008 | Urken | 235/386 |
| 7,974,868 | B2 * | 7/2011 | Tseng et al. | 705/7.31 |
| 2007/0229531 | A1 * | 10/2007 | Park et al. | 345/589 |
| 2010/0036782 | A1 | 2/2010 | Zhao et al. | |
| 2010/0257028 | A1 | 10/2010 | Hillerbrand | |
| 2011/0106528 | A1 | 5/2011 | Maddison | |
| 2011/0264519 | A1 | 10/2011 | Chan et al. | |
| 2012/0203657 | A1 * | 8/2012 | Sushil et al. | 705/26.5 |

OTHER PUBLICATIONS

Kobielus, et al., "The Forrester Wave™: Predictive Analytics and Data Mining Solutions", Published on: Feb. 4, 2010, Available at: http://www.sas.com/news/analysts/forresterwave-predictive-analytics-dm-104388-0210.pdf.
Golbeck, Jennifer, "Semantic Web Interaction through Trust Network Recommender Systems", In Proceedings of the ISWC05 Workshop on End User Semantic Web Interaction, 2005, 8 pages.
Schneider, Karl-Michael, "Weighted Average Pointwise Mutual Information for Feature Selection in Text Categorization", In Proceedings of the 9th European conference on Principles and Practice of Knowledge Discovery in Databases, 2005, pp. 252-263.

* cited by examiner

*Primary Examiner* — Etienne Leroux
(74) *Attorney, Agent, or Firm* — Nicholas Chen; David Andrews; Micky Minhas

(57) ABSTRACT

Embodiments are directed to generating feature values for selectable features using feature recombination. In one scenario, a computer system accesses a set of selectable features where each feature includes one or more feature values. The computer system encodes the accessed set of selectable features, so that the feature values are available for selection by various different users. The computer system generates a first population of feature values from the encoded set of selectable features and ranks each feature value in the first population of feature values based on which feature values are selected by the users. The computer system also generates a second population of feature values by recombining the feature values proportional to the ranking, and further generates subsequent populations of feature values by recombining the values across multiple iterations of expression of preference by different users. These feature values then converge on a subset of preferred feature values.

20 Claims, 4 Drawing Sheets

DISTRIBUTED FEATURE SELECTION IN SOCIAL NETWORKS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, video or keyboard chat programs allow users to type messages to each other or video chat with each other in real time. In some cases, users may form groups based on friendship, common interest or some other criteria. These groups may be referred to as social networks. Social networks may include groups of users that meet in-person, or groups of users that meet on-line. Social networks may include tight-knit groups of personal contacts or very large groups such as political groups. A vast number of social networks exist in communities and online.

In some cases, these social networks may desire to make a collective decision. This decision may involve few options or many. In cases where many different options are available, not all options can be presented to all users. Having users vote for each option or even having users vote through many different rounds may be burdensome on the user.

BRIEF SUMMARY

Embodiments described herein are directed to generating feature values for one or more selectable features using feature recombination. In one embodiment, a computer system accesses a set of selectable features where each feature includes one or more feature values. The computer system encodes the accessed set of selectable features, so that the feature values are mapped into recombinable values which are presented to multiple different users for selection. The computer system generates a first population of feature values from the encoded set of selectable features and ranks each feature value in the first population of feature values based on which feature values are selected by the users. The computer system also generates a second population of feature values by recombining the feature values proportional to the ranking.

Other embodiments include a computer system accessing a set of selectable features, encoding the accessed set of selectable features, so that the feature values are mapped into recombinable values which are presented to multiple different users for selection, generating a first population of feature values from the encoded set of selectable features, ranking each feature value in the first population of feature values based on which feature values are selected by the users and generating a second population of feature values by recombining the feature values proportional to the ranking. The computer system generates subsequent populations of feature values by recombining the feature values across multiple iterations of expression of preference by various different users, and where the users select their preferred candidate feature value at each population of feature values. The feature values then converge on a subset of preferred feature values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
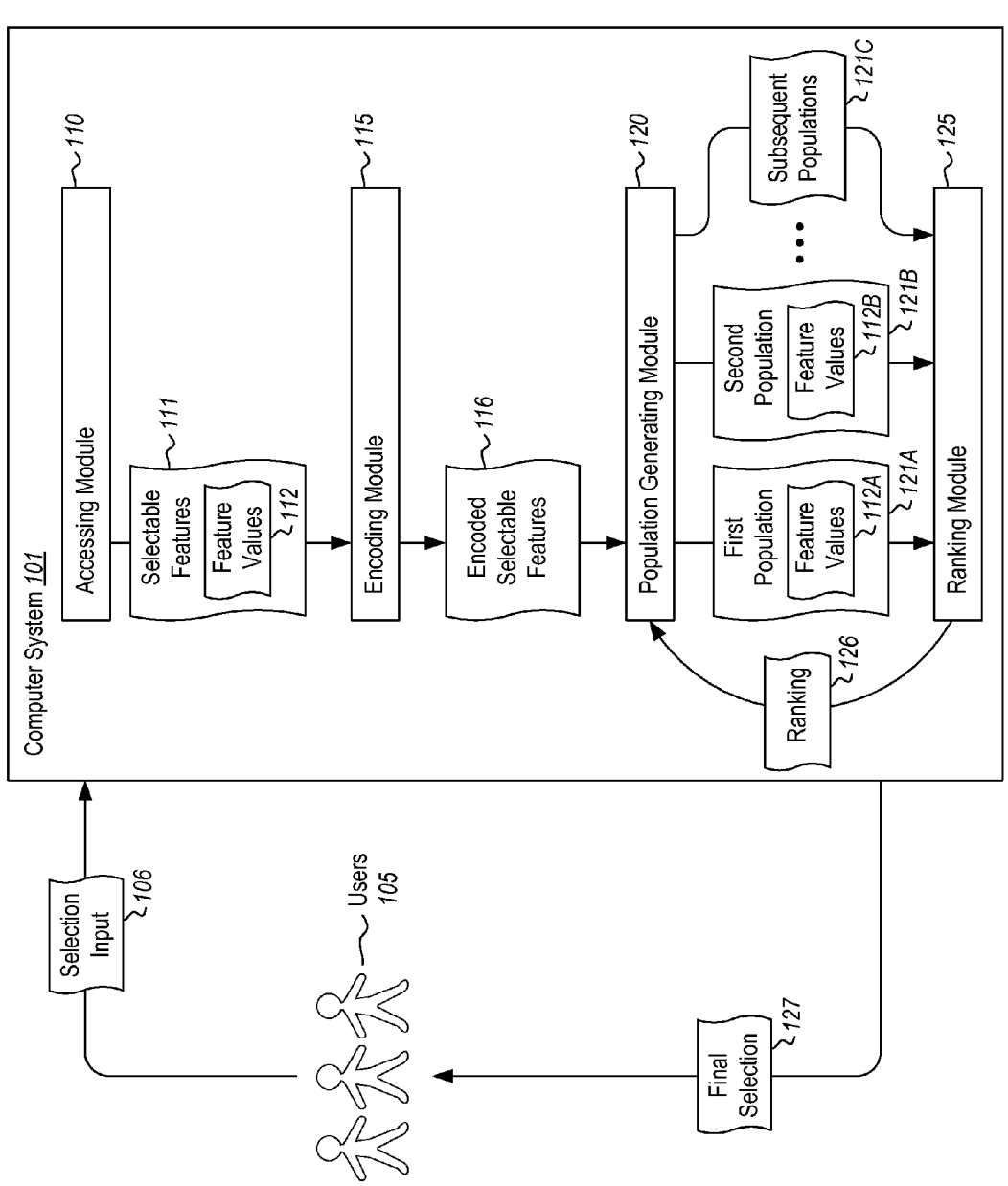
FIG. 1 illustrates a computer architecture in which embodiments described herein may operate including generating feature values for one or more selectable features using feature recombination.

Embodiments described herein are directed to generating feature values for one or more selectable features using feature recombination. In one embodiment, a computer system accesses a set of selectable features where each feature includes one or more feature values. The computer system encodes the accessed set of selectable features, so that the feature values are mapped into recombinable values which are presented to multiple different users for selection. The computer system generates a first population of feature values from the encoded set of selectable features and ranks each feature value in the first population of feature values based on which feature values are selected by the users. The computer system also generates a second population of feature values by recombining the feature values proportional to the ranking.

Other embodiments include a computer system accessing a set of selectable features, encoding the accessed set of selectable features, so that the feature values are mapped into recombinable values which are presented to multiple different users for selection, generating a first population of feature values from the encoded set of selectable features, ranking each feature value in the first population of feature values based on which feature values are selected by the users and generating a second population of feature values by recombining the feature values proportional to the ranking. The computer system generates subsequent populations of feature values by recombining the feature values across multiple iterations of expression of preference by various different users, and where the users select their preferred candidate feature value at each population of feature values. The feature values then converge on a subset of preferred feature values.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, accessing module 110 can be used to access selectable features 111 and feature values 112. As used herein, the term "selectable features" includes substantially any selectable option or other item open to selection by a user. Such options may include, for example, questions with a set of selectable answers (e.g. "Where should we go for lunch today?" followed by a list of restaurants). The feature values may be properties of the features, such as "Italian food" or "Mexican food" for the restaurants in the example above. Many other features and feature values are possible.

Groups of users often come together to make decisions regarding one thing or another. Such groups of users (e.g. 105) may be referred to herein as social networks. Social networks, both large and small, continually generate decisions: When to hold next week's meeting? What are the rules for discussion? Who should be in charge of the budget? What color will the logo be? Determining how the decisions are to be made and who will make them is often an issue among users. Moreover, there may be situations where a group is attempting to select multiple options (e.g. "pick the top three designs").

As such users 105 may converge on a single consensus on their own or may select multiple different preferred options. Coming to a single consensus, however, only tends to happen in small group sizes, tends to be time-consuming, and often fails. In other cases, a single individual unilaterally makes the decisions. While efficient and appropriate for many situations, this approach can potentially upset the group members by fostering disengagement. Attempts to put decision-making into the hands of the social network members come in the form of a voting system. Voting in a social network typically only works with a limited number of options.

To deal with a large number of available options, a voting system will either become so inefficient as to be impractical (e.g requiring a full ranking of all options from every member) or suffer from exploitable disproportionate impact of small numbers of votes, since votes are spread over so many potential options. This runs the risk of causing member disengagement once it becomes obvious how simple it is to "rig" a vote. The modules and elements of computer system 101 provide an efficient decision-making system for arbitrary feature selection within a social network. The system scales to a large number of members and a large number of available options, that reasonably reflects the collective preferences of the users in the social network.

When preferences of members of a social network are intended to be used collectively to select among a set of possibilities, the selection can the made by using the member preference information as the fitness function for a genetic algorithm which operates over the set of selectable features 111. One embodiment includes the following steps: 1) Encoding: The encoding module 115 encodes the set of possible options (i.e. selectable features 111) for selection (resulting in encoded selectable features 116). In some cases, this is done in a relatively flat search space (which, in some embodiments, is typical for an application of a genetic algorithm). 2) Candidate Selection: An initial population (121A) of options is generated using module 120. This population may be distributed (randomly or otherwise) across the search space. In some cases, the candidates on which preferences are expressed in a social network may be pruned randomly. While the potentially most-preferred option may not appear in the generated population, the pruning reduces the number of options when the space of available options is large. Proper encoding (by module 115) and recombination will cause such hidden options to emerge from the algorithm.

3) Ranking: Each individual feature value in the population 121A may then have its "fitness" measured. As used herein, the "fitness" of an option is the degree to which the option is preferred by the members of the social network (e.g. users 105). This preference information could be obtained in a variety of ways. For instance, the preference information could be measured directly as the number of votes received for the option or the relative preference in pairwise comparisons, or it could be measured indirectly as the relative number of times a hyperlink was clicked on which the feature in question was exhibited.

4) Recombination: A subsequent generation of options (e.g. population 121B) is generated by module 120, recombining features of the various options proportionally to the relative fitness measurements. The specific method of recombination may vary, and depends on the details of the encoding method from step 1. At least in some cases, it includes taking some portion of the encoded value from each of two or more "parent" candidates, chosen randomly from the first population 121A with odds proportional to the relative fitness of the candidates. In the case of a social network, multi-parent recombination may be used to more quickly converge upon a consensus candidate population. Random mutations may be introduced at this step, as is performed in a genetic recombination. 5) Iterate: Optionally repeat from step 3 with the new population (121B). 6) Final Selection: A final selection is made from the top ranked instances of the resulting generation. It should be noted here that if step 5 is skipped, this can be combined with step 4, generating only a single recombined value.

The following is an example of basic feature selection with one generation. In this example, a number of individuals in a social network may be attempting to collectively select a color (e.g. choosing a color for a group logo). With a relatively small social network and a relatively tractable space of available options, a subset of the steps listed above can be used. 1) Encoding: A color can be broken down into constituent components of red, green, and blue, with (e.g. 8) bits of data representing the range of color intensity in each of those primary colors. Alternatively, the color could be encoded as 8 bits each for hue, saturation and intensity, thereby providing a relatively flatter search space, as single-bit changes in the value will typically have less radical impact on the perception of the resulting color.

2) Candidate Selection: A visual selection interface may be used to select from the full space of possible colors, any one of which may be suitable for step 3. Thus, at least in this example, pruning may not be necessary. 3) Ranking. Any of a variety of distributed mechanisms for data entry may be used to rank the selected colors. For example, a web server may authenticate members of the social network and register the color selection (e.g. 106) of each member. Thus, in some cases, each member may be requested to enter three numbers in the range of 0 to 255, representing values for each of the three primary colors. It should be noted that the mechanism of data entry for ranking does not need to match the encoding scheme used for recombination. 4) Recombination/Final Selection: The computer system 101 iterates through each of the (e.g. 24) bits used to select a color and chooses one of the members at random for each bit. The system then uses their 0 or 1 value for that bit position in the aggregated color. This gives each user an equal weight in selecting the final color.

In another embodiment, complex feature selection with multiple generations is shown. In this embodiment, a scenario is provided: the computer system 101 is to be used to optimize banner ads automatically, choosing the background color, foreground color and font family for optimal click-throughs. With a relatively massive social network and a limited ability to test all options simultaneously, the full set of steps listed above is to be used. 1) Encoding: The two color properties (background and foreground) can be encoded as in the logo color example above. Font family has multiple different traits of typefaces (e.g. feature values 112) that can be utilized in the encoding, such as presence/absence of serif, proportional versus monospaced, height of capitalized letters, ascender height, and descender height, as well as the basic type of typeface (e.g. Roman, Blackletter, Gaelic, Script, Novelty, etc.). The bits from the font family and color properties are combined into a single "genome" for the banner ad.

2) Candidate Selection: Random selection from the space of possible candidates may be used but may not be preferred, as many of the results may be unreadable. Moreover, full manual seeding may introduce too much bias to make the genetic algorithm successful. A combination of random and manual seeds may be used in this situation. The number of candidates selected should be as large as possible while still allowing each candidate ad to receive a significant number of views during each generation (to ensure the ranking step is statistically meaningful).

3) Ranking. The full population of candidate banner ads is placed into random rotation. Each time an ad generates a click-through, this is treated as a "vote" for the genome of that ad. 4) Recombination: To create the new generation of ads, for each new ad the system selects a pair of "parent" ads randomly from the previous generation, proportional to the number of click-throughs that ad received. Then, bits for the "child" ad's genome are copied from the corresponding position of one of the parent's genome. At a low rate, some bits may be randomly flipped (to add random mutation) to allow for novelty to be introduced to the pool of possibilities. 5) Iterate: The new generation of ads is released (e.g. population 121B), replacing the previous generation. 6) Final Selection: In this case, there may be no final selection step performed. This allows the population of ads to continue to adapt as the social network itself alters its preferences over time (due to changing tastes or simply oversaturation of the successful ads). The concepts outlined in the above embodiments will be explained further below with regard to methods 200 and 300 of FIGS. 2 and 3, respectively.

Figure 2:
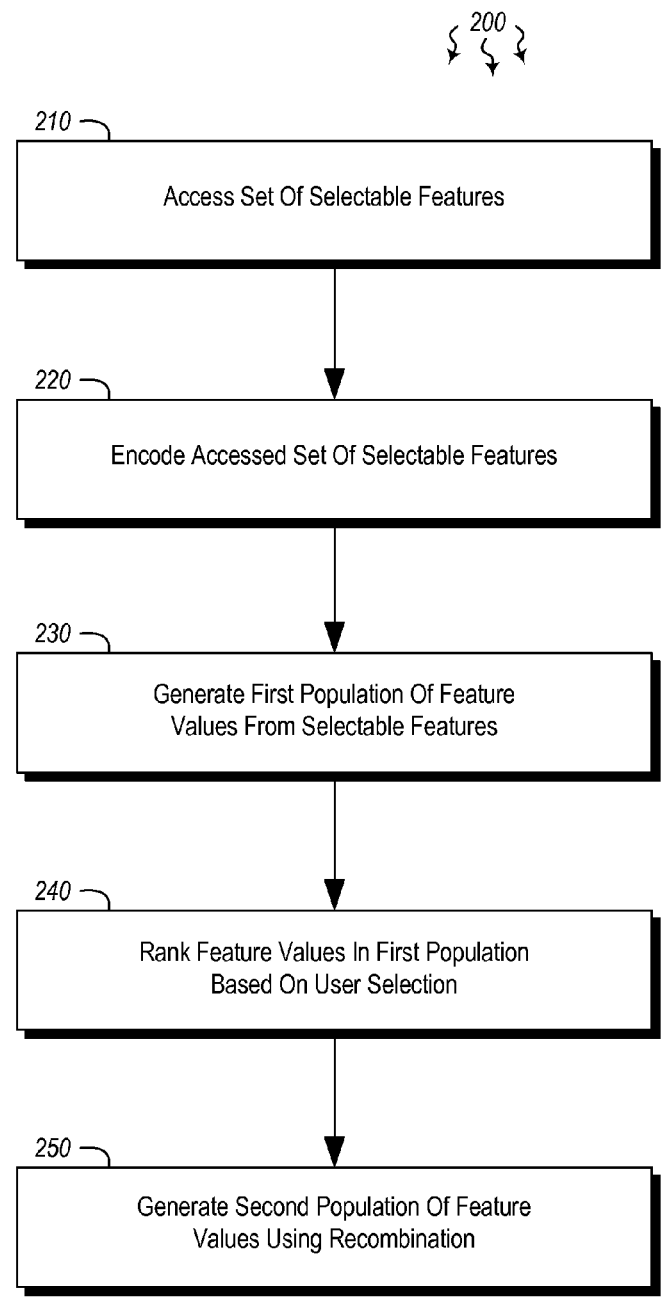
FIG. 2 illustrates a flowchart of an example method for generating feature values for one or more selectable features using feature recombination.
Figure 3:
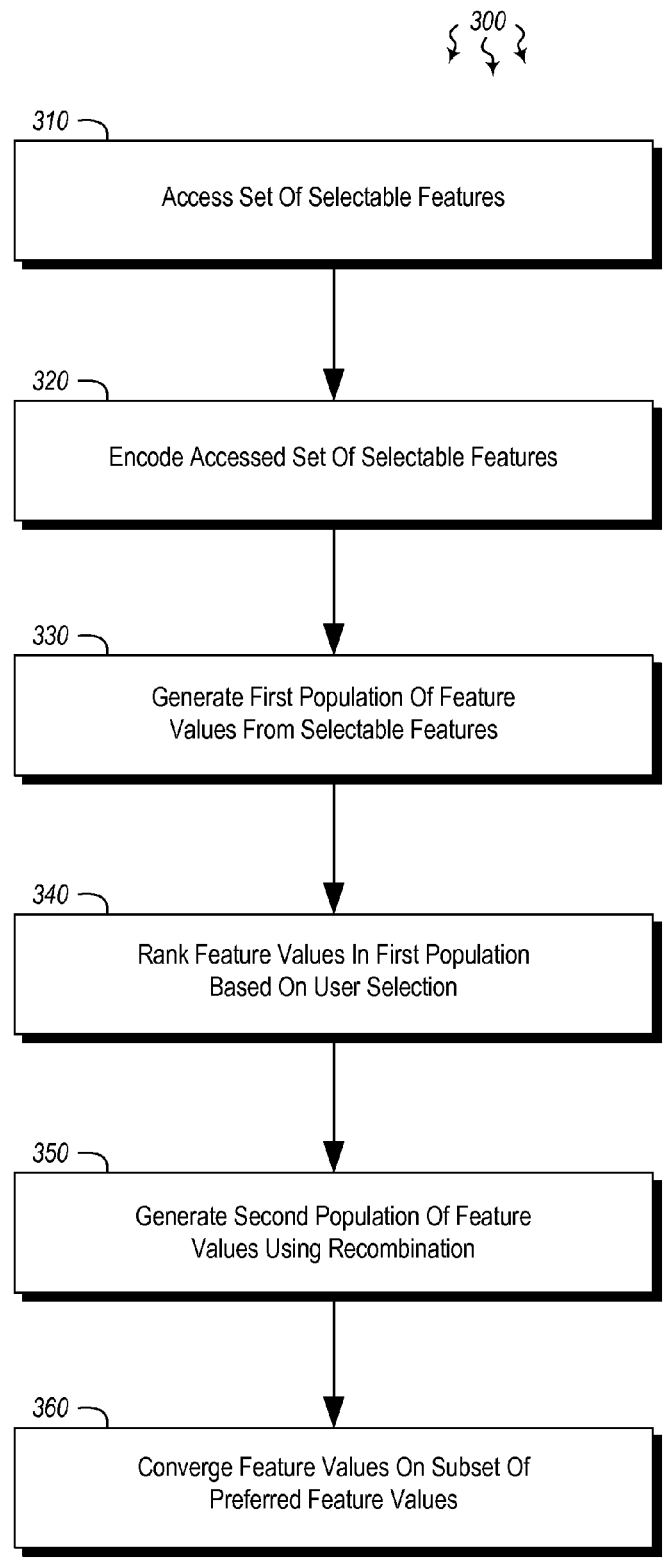
FIG. 3 illustrates a flowchart of an alternative example method for generating feature values for one or more selectable features using feature recombination.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for generating feature values for one or more selectable features using feature recombination. The method 200 will now be described with frequent reference to the components and data of environment 100.

Method 200 includes an act of accessing a set of selectable features, each feature including one or more feature values (act 210). For example, accessing module 110 of computer system 101 accesses selectable features 111, where each of the selectable features has related feature values 112. The feature values may be instances of the feature. For example, "Color" may be a feature, while "Red" is a feature value.

Method 200 also includes an act of encoding the accessed set of selectable features, such that the feature values are mapped into one or more recombinable values (act 220). These recombinable values may then be presented to the users for selection. As mentioned above, encoding module 115 may be used to encode the set of selectable features 111 to map the features values into a value that is recombinable with other values. The encoding may include, for example, breaking a color down into its constituent parts, with certain portions of data representing the range of color intensity in each of those primary colors. Alternatively, the color could be encoded for hue, saturation and intensity. Many other examples are possible.

Method 200 includes an act of generating a first population of feature values from the encoded set of selectable features (act 230). For example, population generating module 120 may generate first population 121A which includes feature values 112A. The first population is thus the first iteration or generation of encoded feature values. These feature values are then ranked (e.g. by ranking module 125) based on which feature values are selected by the plurality of users (act 240). The user selections may be direct or indirect. The population generating module 120 may then generate a second population 121B of feature values 112B by recombining the feature values proportional to the ranking 126 (act 250).

In some cases, the features values may be proportionally selected from each population of feature values as part of genetic algorithm crossover recombination (i.e. picking proportionally from two parent candidates). Accordingly, feature values that are more preferred (e.g. are more often selected) will reappear in subsequent populations. In this manner, candidate features or feature values may converge on a single value, or may change continually over time as subsequent user selections (106) are received. User's preferences may be gathered either directly (where users select the preferred feature) or indirectly (where users select a preferred item and feature values are derived from the preferred item). Feature values may also be proportionally selected from each population of feature values as part of a weighted averaging algorithm. In such cases, the weighted average of a set of selectable features 111 is used in generating subsequent generations of features.

During the generation of the first population 121A, the second population 121B, or any subsequent populations 121C, random mutations may be inserted into the feature values. This ensures that new possibilities are continually added to the pool of selectable features 111. In some cases, the second population of feature values may be recombined across multiple iterations of expression of preference by the plurality of users. This may result in the generation of many subsequent generations 121C, and each generation may reduce the overall number of selectable features. In some cases, this will converge on a single selectable feature. The users 105, whether from a social network or other group, may each select their own preferred candidate feature value at each population of feature values. In some embodiments, at least one of the subset of preferred feature values is selected as being representative of a certain group of users' selection (for example, all employees or all executives, or all human resources personnel, etc.).

Candidate feature values may be pruned at the first iteration (i.e. the initial population) to reduce the number of available candidate feature values. The pruning may occur randomly or using some type of knowledge about the feature values. For instance, the candidate feature values may be pruned using domain-specific knowledge about the user-preferred feature values. The pruning may result in a subset of preferred feature values. As subsequent populations are generated, the selected feature values from the subset of preferred feature values evolve over the different iterations. From this subset, one or more preferred feature values may be selected for each of a plurality of different groups of users. It should also be noted that features and/or feature values may be kept together in subsequent generations. For example, if two features or feature values repeatedly appear together (e.g. one does not appear without the other), the two features may be kept together in each subsequent generation. As such the two features either both show up in the population or do not show up at all. Moreover, each new candidate feature may have multiple parents (instead of just two). This maintains an open space of possibilities and ensures that the pool of candidate features does not narrow too quickly.

FIG. 3 illustrates a flowchart of a method 300 for generating feature values for one or more selectable features using feature recombination. The method 300 will now be described with frequent reference to the components and data of environment 100.

Method 300 includes an act of accessing a set of selectable features, each feature including one or more feature values (act 310). For example, accessing module 110 may access selectable features 111, along with corresponding feature values 112. This set of selectable features may be randomly seeded (by randomly assigning numbers to features values to seed the pool) or may be seeded according to some prior knowledge about the set of selectable features. The encoding module 115 may encode the accessed set of selectable features, such that the feature values are mapped into one or more recombinable values (act 320). These recombinable values are then presented to the users 105 for selection. Population generating module 120 may then generate a first population 121A of feature values 112A from the encoded set of selectable features 116 (act 330). The features values are then ranked based on which feature values were selected by the users (act 340).

Method 300 further includes an act of generating a second population 121B of feature values 112B by recombining the feature values proportional to the ranking. The second population of feature values is recombined across multiple iterations of expression of preference by the users 105. Each user selects their preferred candidate feature value at each population of feature values (act 350). As subsequent populations are generated, the features values will converge on a subset of preferred feature values (act 360). These preferred feature values may be presented as the decision of the group, or the group consensus.

Figure 4:
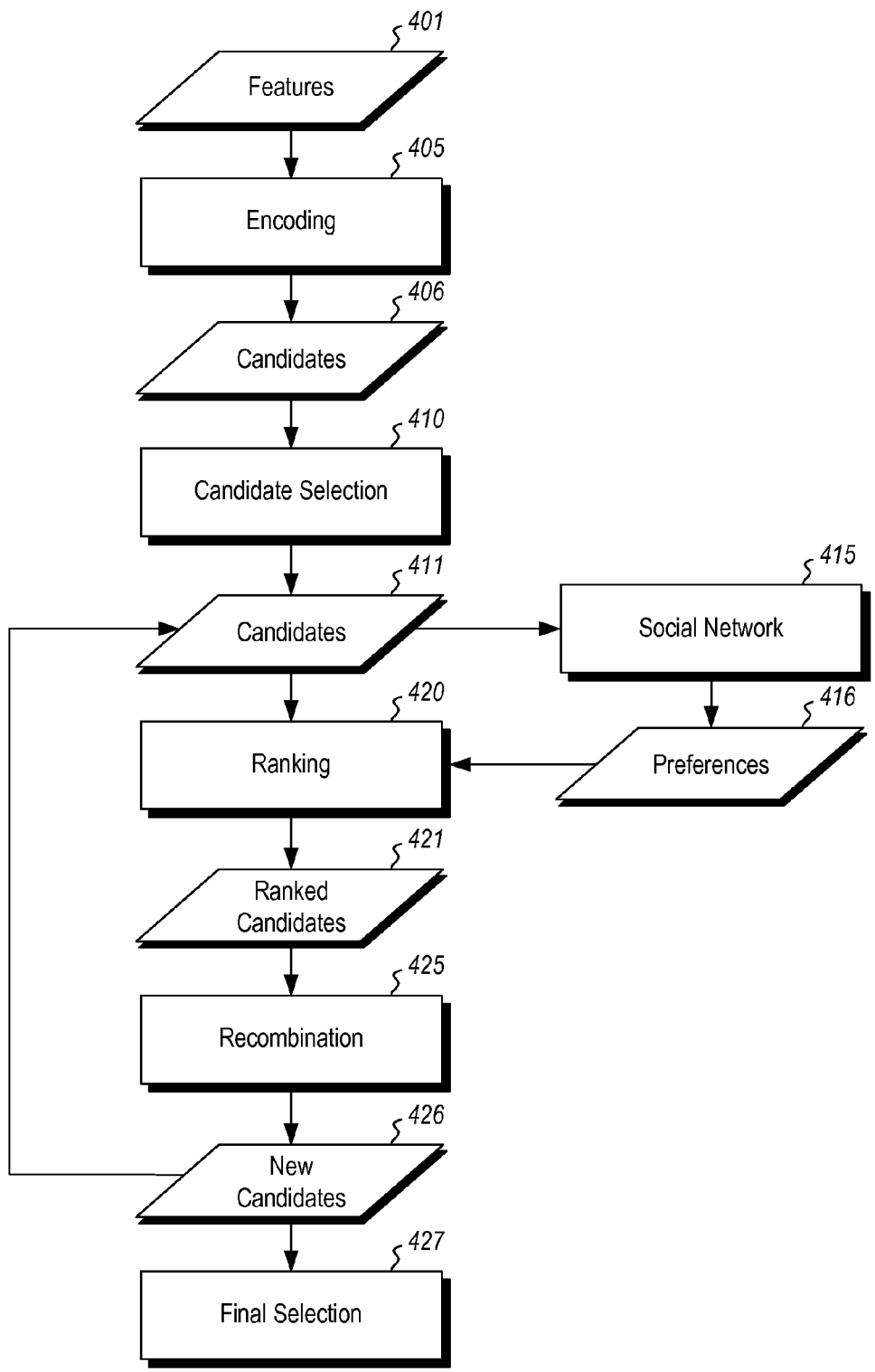
FIG. 4 illustrates an example dataflow diagram for distributed feature selection.

As shown in FIG. 4, a consensus or final selection 427 may be generated as illustrated in the data flow diagram. For instance, features 401 may be encoded at 405, and the candidates 406 may be selected at 410. Selected candidates 411 may be sent to a social network 415 (or other group of users) for an indication of preference 416. Once the users have provided their preferences (either directly or indirectly), the candidates are ranked at 420 and the ranked candidates 421 are recombined using any of the genetic algorithms described above. New candidates 426 emerging from the recombination may be sent back to the social network for expression of preference. And, as mentioned above, subsequent generations of candidates eventually converge on a final selection 427, which may be sent to the user group as an indication of a final group decision.

Accordingly, methods, systems and computer program products are provided which generate feature values for one or more selectable features using feature recombination. Users may express preference for certain features, which are ranked and recombined to generate a final result. Moreover, methods, systems and computer program products are provided which iterate over multiple generations and also keep specified combinations of features together during the creation of subsequent generations.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, causes the computing system to perform a method for generating feature values for one or more selectable features using feature recombination, the method comprising the following:
an act of accessing a set of selectable features, each feature including one or more feature values;
an act of encoding the accessed set of selectable features, such that the feature values are mapped into one or more recombinable values and which are presented to a plurality of users for selection;
an act of generating a first population of feature values from the encoded set of selectable features;
an act of ranking each feature value in the first population of feature values based on which feature values are selected by the plurality of users; and
an act of generating a second population of feature values by recombining the feature values proportional to the ranking, wherein generating the second population of feature values includes at least one of:
proportionally selecting feature values from the first population of feature values as part of a genetic algorithm crossover recombination, or
inserting one or more random mutations in the second population of feature values.

2. The computer system of claim 1, wherein the second population of feature values is recombined across multiple iterations of expression of preference by the plurality of users.

3. The computer system of claim 2, wherein the plurality of users selects their preferred candidate feature values at each population of feature values.

4. The computer system of claim 3, wherein the feature values converge on a subset of preferred feature values.

5. The computer system of claim 4, wherein at least one of the subset of preferred feature values is selected as being representative of the plurality of users' selection.

6. The computer system of claim 4, wherein at least one of the subset of preferred feature values is selected by each of a plurality of different groups of users.

7. The computer system of claim 1, wherein the act of generating a first population of feature values from the encoded set of selectable features comprises pruning one or more candidate feature values to reduce the number of available candidate feature values.

8. The computer system of claim 7, wherein the candidate feature values are pruned randomly.

9. The computer system of claim 7, wherein the candidate feature values are pruned using domain-specific knowledge about user-preferred feature values.

10. The computer system of claim 7, wherein the second population of feature values is recombined across multiple iterations of expression of preference by the plurality of users.

11. The computer system of claim 1, wherein recombining the feature values proportional to the ranking comprises proportionally selecting feature values from the first population of feature values as part of the genetic algorithm crossover recombination.

12. The computer system of claim 1, wherein recombining the feature values proportional to the ranking further comprises proportionally selecting feature values from the first population of feature values as part of a weighted averaging algorithm.

13. The computer system of claim 1, wherein the act of generating a second population of feature values by recombining the feature values proportional to the ranking further comprises inserting the one or more random mutations in the second population of feature values.

14. The computer system of claim 1, wherein at least one combination of features is kept together in the second population of feature values.

15. The computer system of claim 1, wherein a plurality of subsequent populations are generated by recombining the selected feature values of each population proportional to the feature's ranking in each generation.

16. The computer system of claim 1, wherein user preference for one or more identified feature values is gathered at least one of directly and indirectly.

17. A computer-implemented method for generating feature values for one or more selectable features using feature recombination, the method being implemented by a computing system that includes at least one processor, the method comprising the following:
   an act of accessing a set of selectable features, each feature including one or more feature values;
   an act of encoding the accessed set of selectable features, such that the feature values are mapped into one or more recombinable values and which are presented to a plurality of users for selection;
   an act of generating a first population of feature values from the encoded set of selectable features;
   an act of ranking each feature value in the first population of feature values based on which feature values are selected by the plurality of users; and
   an act of generating a second population of feature values by recombining the feature values proportional to the ranking, wherein generating the second population of feature values includes at least one of:
      proportionally selecting feature values from the first population of feature values as part of a genetic algorithm crossover recombination, or
      inserting one or more random mutations in the second population of feature values.

18. A computer storage device comprising stored computer-executable instructions which, when executed by at least one processor of a computing system, implement a method for generating feature values for one or more selectable features using feature recombination, wherein the method includes the computing system causing the performance of:
   an act of accessing a set of selectable features, each feature including one or more feature values;
   an act of encoding the accessed set of selectable features, such that the feature values are mapped into one or more recombinable values and which are presented to a plurality of users for selection;
   an act of generating a first population of feature values from the encoded set of selectable features;
   an act of ranking each feature value in the first population of feature values based on which feature values are selected by the plurality of users; and
   an act of generating a second population of feature values by recombining the feature values proportional to the ranking, wherein generating the second population of feature values includes at least one of:
      proportionally selecting feature values from the first population of feature values as part of a genetic algorithm crossover recombination, or
      inserting one or more random mutations in the second population of feature values.

19. The computer storage device of claim 18, wherein generating the second population of feature values comprises said proportionally selecting feature values from the first population of feature values as part of the genetic algorithm crossover recombination.

20. The computer storage device of claim 18, wherein generating the second population of feature values comprises said inserting the one or more random mutations in the second population of feature values.

* * * * *